United States Patent
Hong et al.

(10) Patent No.: US 11,151,474 B2
(45) Date of Patent: Oct. 19, 2021

(54) GPU-BASED ADAPTIVE BLAS OPERATION ACCELERATION APPARATUS AND METHOD THEREOF

(71) Applicant: ELECTRONICS AND TELECOMMUNICATIONS RESEARCH INSTITUTE, Daejeon (KR)

(72) Inventors: Seung-Tae Hong, Daejeon (KR); Young-Joo Kim, Daejeon (KR); Jeong-Si Kim, Daejeon (KR); Jin-Ho Seol, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 605 days.

(21) Appl. No.: 16/013,847

(22) Filed: Jun. 20, 2018

(65) Prior Publication Data
US 2019/0228344 A1    Jul. 25, 2019

(30) Foreign Application Priority Data

Jan. 19, 2018  (KR) .................. 10-2018-0006966

(51) Int. Cl.
*G06N 20/00*     (2019.01)
*G06F 17/11*     (2006.01)
(Continued)

(52) U.S. Cl.
CPC ............. *G06N 20/00* (2019.01); *G06F 8/40* (2013.01); *G06F 8/443* (2013.01); *G06F 8/45* (2013.01); *G06F 17/11* (2013.01)

(58) Field of Classification Search
CPC ........ G06N 99/005; G06N 20/00; G06N 3/04; G06N 3/08; G06N 3/063; G06N 3/0454;
(Continued)

(56) References Cited

U.S. PATENT DOCUMENTS 7,548,892 B2    6/2009  Buck et al.
10,705,964 B2 *  7/2020  Doshi .................. G06F 12/121
(Continued)

FOREIGN PATENT DOCUMENTS

KR    10-2005-0056124 A    6/2005
KR    1020140093593 A    7/2014
(Continued)

OTHER PUBLICATIONS

Nugteren, "CLBlast: A Tuned OpenCL BLAS Library," arXiv:1705.05249v1 [cs.MS], May 12, 2017, pp. 1-8.

*Primary Examiner* — Mouloucoulaye Inoussa

(57) ABSTRACT

Disclosed herein are an apparatus and method for adaptively accelerating a BLAS operation based on a GPU. The apparatus for adaptively accelerating a BLAS operation based on a GPU includes a BLAS operation acceleration unit for setting optimal OpenCL parameters using machine-learning data attribute information and OpenCL device information and for creating a kernel in a binary format by compiling kernel source code; an OpenCL execution unit for creating an OpenCL buffer for a BLAS operation using information about an OpenCL execution environment and the optimal OpenCL parameters and for accelerating machine learning in an embedded system in such a way that a GPU that is capable of accessing the created OpenCL buffer performs the BLAS operation using the kernel, and an accelerator application unit for returning the result of the BLAS operation to a machine-learning algorithm.

17 Claims, 11 Drawing Sheets

(51) Int. Cl.
*G06F 8/41* (2018.01)
*G06F 8/40* (2018.01)

(58) Field of Classification Search
CPC ...... G06N 3/084; G06N 3/0445; G06N 3/082; G06N 3/0427; G06N 3/0418; G06F 17/11; G06F 8/443; G06F 8/40; G06F 8/45; G06F 9/3017; G06F 9/3851; G06F 9/3895; G06F 9/3001; G06F 9/3887; G06F 16/2246; G06F 8/4442; G06F 17/16; G06T 1/20
See application file for complete search history.

(56) References Cited

U.S. PATENT DOCUMENTS

| | | | | |
|---|---|---|---|---|
| 2013/0141443 | A1* | 6/2013 | Schmit | G06F 8/41 345/505 |
| 2015/0253747 | A1 | 9/2015 | Chun et al. | |
| 2017/0083827 | A1 | 3/2017 | Robatmili et al. | |
| 2017/0255877 | A1 | 9/2017 | Cho et al. | |
| 2018/0285117 | A1* | 10/2018 | Surti | G06F 9/3004 |
| 2018/0315158 | A1* | 11/2018 | Nurvitadhi | G06F 9/3017 |
| 2019/0087713 | A1* | 3/2019 | Lamb | G06N 3/0454 |
| 2019/0347125 | A1* | 11/2019 | Sankaran | G06F 9/4881 |
| 2019/0370647 | A1* | 12/2019 | Doshi | G06N 3/08 |
| 2020/0082264 | A1* | 3/2020 | Guo | G06N 3/04 |
| 2020/0097826 | A1* | 3/2020 | Du | G06N 3/0454 |
| 2020/0175352 | A1* | 6/2020 | Cha | G06T 7/001 |
| 2020/0320369 | A1* | 10/2020 | Meng | G06F 17/16 |
| 2020/0342632 | A1* | 10/2020 | Frumkin | G06T 9/002 |
| 2020/0364288 | A1* | 11/2020 | Wen | G06F 17/16 |
| 2020/0387799 | A1* | 12/2020 | Vivekraja | G06N 3/10 |

FOREIGN PATENT DOCUMENTS

| | | |
|---|---|---|
| KR | 10-2014-0097548 A | 8/2014 |
| KR | 1020170085455 A | 7/2017 |

* cited by examiner

FIG. 5

| OpenCL DEVICE INFORMATION | DESCRIPTION |
|---|---|
| CL_PLATFROM_VERSION | OpenCL VERSION |
| CL_DEVICE_TYPE | DEVICE TYPE |
| CL_DEVICE_HOST_UNIFIED_MEMORY | WHETHER UNIFIED MEMORY STRUCTURE IS SUPPORTED |
| CL_DEVICE_MAX_WORK_ITEM_DIMENSIONS | MAXIMUM NUMBER OF DIMENSIONS IN INDEX SPACE |
| CL_DEVICE_LOCAL_MEM-TYPE | WHETHER LOCAL MEMORY IS SUPPORTED |
| CL_DEVICE_LOCAL_MEM-SIZE | LOCAL MEMORY SIZE |
| CL_KERNEL_PREFERRED_WORK_GROUP_SIZE_MULTIPLE | PREFERRED MULTIPLE OF WORK GROUP SIZE |

FIG. 10

GPU-BASED ADAPTIVE BLAS OPERATION ACCELERATION APPARATUS AND METHOD THEREOF

CROSS REFERENCE TO RELATED APPLICATION

This application claims the benefit of Korean Patent Application No. 10-2018-0006966, filed Jan. 19, 2018, which is hereby incorporated by reference in its entirety into this application.

BACKGROUND OF THE INVENTION

1. Technical Field

The present invention relates generally to technology for adaptively accelerating Basic Linear Algebra Subprograms (BLAS) operations, and more particularly to technology for accelerating BLAS operations based on OpenCL in order to accelerate machine learning in an embedded system.

2. Description of the Related Art

Recently, with increasing interest in machine learning, various approaches for accelerating machine learning are being employed. Most operations in machine learning are matrix operations. When it comes to performing matrix operations, a GPU, which is designed to be specialized for arithmetic operations, provides better performance than a CPU, which is designed to focus on general purposes. Accordingly, parallel computing languages, such as an Open Computing Language (OpenCL) and the like, are receiving a lot of attention as means for accelerating the execution of matrix operations when machine learning is performed.

OpenCL is an open and general-purpose parallel computing framework, and provides a standard interface for parallel computing across heterogeneous platforms configured with CPUs, GPUs, and other processors. OpenCL may run on hardware manufactured by various hardware vendors, and may thus enable the same program to be run on various kinds of platforms, such as mobile phones, laptops, super computers, and the like.

OpenCL is configured with a host program run on a host processor and a kernel run on a computing device. The host program defines an index space for executing the kernel, and an instance of the kernel, that is, a work item is executed for each point in the index space. A work group consists of multiple work items, and all work groups have the same size. The index space is divided evenly into work groups having the same size, and work items in each work group are executed in parallel on the processing elements of a single compute unit inside the device.

Accordingly, in order to maximize performance when an operation is performed in OpenCL, work items within a work group must be executed in parallel to the greatest extent possible in the compute unit. Accordingly, research for setting the optimal size of a work group for maximizing the workload of each kernel, research for using the local memory of a device in order to minimize the memory access expense in the device, and the like, are actively conducted in order to improve the OpenCL operation performance.

However, because the structure of an embedded system differs from that of an existing desktop PC, research for accelerating the execution of matrix operations based on OpenCL in the embedded system has not been sufficiently studied. Particularly, most embedded systems have a unified memory structure in which a host processor and a computing device share memory therebetween. Also, local memory within a GPU may not have performance advantages over global memory in some cases depending on the chipset vendor of the embedded system.

Accordingly, application of the existing optimization method in the embedded systems may not improve performance, or the existing optimization method may act as overhead in the embedded system.

Therefore, in order to solve the above problems and to accelerate machine learning in the embedded system, it is necessary to develop a technique for adaptively accelerating a BLAS operation based on a GPU. In connection with this, Korean Patent Application Publication No. 10-2014-0093593 discloses a technology related to "Method and system for determining work group size and computer-readable recording medium therefor".

SUMMARY OF THE INVENTION

An object of the present invention is to accelerate machine learning in an embedded system.

Another object of the present invention is to automatically create OpenCL parameters and a kernel optimized for an embedded system and the type of Basic Linear Algebra Subprograms (BLAS) operation and to thereby enable laypeople to apply a BLAS operation acceleration function to a machine-learning algorithm.

A further object of the present invention is to internally perform host program configuration and optimization-related functions without user control, to thereby enable laypeople to apply a BLAS operation acceleration function to a machine-learning algorithm.

In order to accomplish the above objects, an apparatus for adaptively accelerating a BLAS operation based on a GPU according to an embodiment of the present invention includes a BLAS operation acceleration unit for setting optimal OpenCL parameters using machine-learning data attribute information and OpenCL device information and for creating a kernel in a binary format by compiling kernel source code; an OpenCL execution unit for creating an OpenCL buffer for a BLAS operation using information about an OpenCL execution environment and the optimal OpenCL parameters and for accelerating machine learning in an embedded system in such a way that a GPU that is capable of accessing the created OpenCL buffer performs the BLAS operation using the kernel; and an accelerator application unit for returning a result of the BLAS operation to a machine-learning algorithm.

Here, the apparatus may further include an accelerator analysis unit for creating the OpenCL device information when an initial analysis process is performed, and the OpenCL device information may be stored a local file system of the embedded system and be used to set the OpenCL parameters whenever the machine learning is performed in the embedded system.

Here, the accelerator application unit may determine whether the machine-learning data attribute information matches a size of actual data based on a matrix size value and a data type input thereto, and may thereby verify validity of the machine-learning data attribute information.

Here, the machine-learning data attribute information may include at least one of a matrix-size-setting argument, a scalar value, and information about whether a matrix is a transpose matrix, and may vary depending on a type of the BLAS operation.

Here, the OpenCL parameters may include a parameter for at least one of a vector grouping number, a size of a work group, information about whether to apply memory mapping, information about whether a unified memory structure is supported, information about whether local memory is supported, and a size of local memory.

Here, the OpenCL execution unit may enable a CPU of the embedded system to directly access the result of the BLAS operation using a memory-mapping function when application of memory mapping is set.

Here, the OpenCL execution unit may copy the result of the BLAS operation from a memory area of the GPU to a memory area of the CPU using a buffer read function of OpenCL when application of memory mapping is not set.

Here, the BLAS operation acceleration unit may select a template for the BLAS operation based on a type of the BLAS operation and on the machine-learning data attribute information, create the kernel source code corresponding to the OpenCL parameters in the selected template, and create the kernel in a binary format by compiling the kernel source code.

Here, when data of machine learning are constant, the OpenCL execution unit may reuse the previously created kernel in order to minimize an amount of time taken to perform the BLAS operation.

Here, the BLAS operation acceleration unit may set a size of data to be copied to the local memory based on the size of the local memory of the OpenCL parameters when an OpenCL device supports local memory.

Also, an apparatus for adaptively accelerating a BLAS operation based on a GPU according to another embodiment of the present invention may include an accelerator application unit for delivering machine-learning data attribute information corresponding to a machine-learning algorithm to a BLAS operation acceleration unit when the machine-learning algorithm in an embedded system invokes a BLAS operation; the BLAS operation acceleration unit for configuring an OpenCL execution environment for the embedded system based on the machine-learning data attribute information, which is received from the accelerator application unit, and on OpenCL device information and for creating OpenCL parameters and a kernel; and an OpenCL execution unit for performing the BLAS operation, accelerated through the OpenCL parameters and the kernel, and returning a result of the BLAS operation to the machine-learning algorithm through the accelerator application unit.

Also, a method for adaptively accelerating a BLAS operation based on a GPU, performed by an apparatus for adaptively accelerating a BLAS operation based on a GPU, according to an embodiment of the present invention includes setting optimal OpenCL parameters using machine-learning data attribute information and OpenCL device information; creating a kernel in a binary format by compiling kernel source code; creating an OpenCL buffer for a BLAS operation using information about an OpenCL execution environment and the optimal OpenCL parameters; performing, by the GPU that is capable of accessing the created OpenCL buffer, the BLAS operation using the kernel in order to accelerate machine learning in an embedded system; and returning a result of the BLAS operation to a machine-learning algorithm.

Here, the OpenCL device information may be created when an initial analysis process is performed, be stored in a local file system of the embedded system, and be used to set the OpenCL parameters whenever the machine learning is performed in the embedded system.

Here, the machine-learning data attribute information may include at least one of a matrix-size-setting argument, a scalar value, and information about whether a matrix is a transpose matrix, and may vary depending on a type of the BLAS operation.

Here, the method may further include determining whether the machine-learning data attribute information matches a size of actual data based on an input matrix size value and an input data type, and thereby verifying validity of the machine-learning data attribute information.

Here, the OpenCL parameters may include a parameter for at least one of a vector grouping number, a size of a work group, information about whether to apply memory mapping, information about whether a unified memory structure is supported, information about whether local memory is supported, and a size of local memory.

Here, returning the result of the BLAS operation may be configured to enable a CPU of the embedded system to directly access the result of the BLAS operation using a memory-mapping function when application of memory mapping is set.

Here, returning the result of the BLAS operation may be configured to copy the result of the BLAS operation from a memory area of the GPU to a memory area of the CPU using a buffer read function of OpenCL when application of memory mapping is not set.

Here, creating the kernel in a binary format may include selecting a template for the BLAS operation based on a type of the BLAS operation and the machine-learning data attribute information; creating the kernel source code corresponding to the OpenCL parameters in the selected template; and creating the kernel in a binary format by compiling the kernel source code.

Here, when data of machine learning are constant, the previously created kernel may be reused in order to minimize an amount of time taken to perform the BLAS operation.

BRIEF DESCRIPTION OF THE DRAWINGS

The above and other objects, features and advantages of the present invention will be more clearly understood from the following detailed description taken in conjunction with the accompanying drawings, in which:

FIG. 5 is an exemplary view that shows the process of multiplying matrices according to an embodiment of the present invention;

FIG. 10 is an exemplary view that shows OpenCL device information according to an embodiment of the present invention;

DESCRIPTION OF THE PREFERRED EMBODIMENTS

Figure 1:
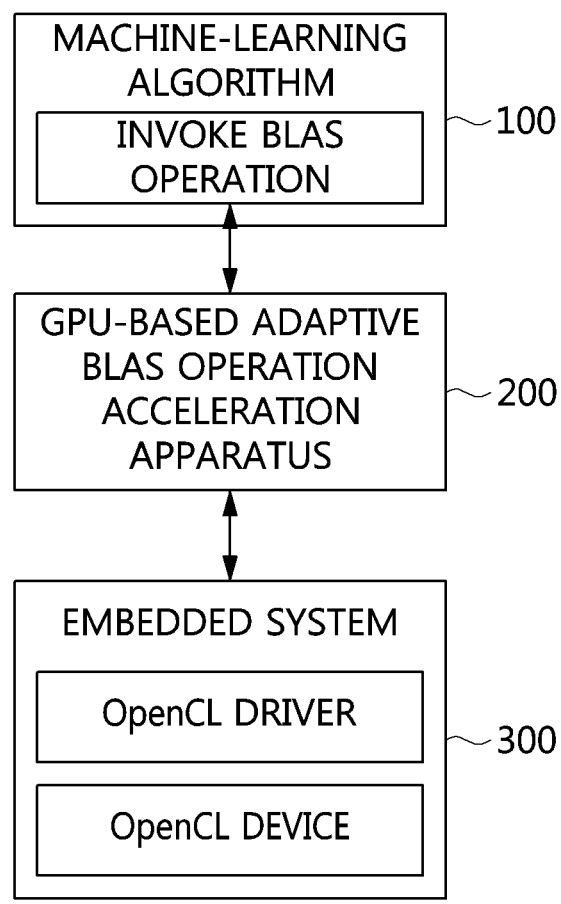
FIG. 1 is a view that schematically shows an environment in which an apparatus for adaptively accelerating a BLAS operation based on a GPU is applied according to an embodiment of the present invention.

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that schematically shows an environment in which an apparatus for adaptively accelerating a BLAS operation based on a GPU is applied according to an embodiment of the present invention.

As illustrated in FIG. 1, when a machine-learning algorithm 100 invokes a Basic Linear Algebra Subprograms (BLAS) operation, a GPU-based adaptive BLAS operation acceleration apparatus 200 according to an embodiment of the present invention adaptively accelerates the BLAS operation depending on the structure of memory in an embedded system 300 and on machine-learning data attribute information.

The GPU-based adaptive BLAS operation acceleration apparatus 200 may perform initial analysis on the embedded system 300 and machine-learning data, configure an OpenCL execution environment specialized in the embedded system 300 using OpenCL device information and machine-learning data attribute information, and create OpenCL parameters and a kernel.

Here, the initial analysis may be performed only when an OpenCL device, which is an accelerator, has not been analyzed. Also, OpenCL device information may be created by analyzing the OpenCL device of the embedded system 300, and may be used when OpenCL parameters and a kernel are created.

The GPU-based adaptive BLAS operation acceleration apparatus 200 provides a user interface through which an adaptive BLAS operation acceleration function may be used in the machine-learning algorithm 100. Also, the GPU-based adaptive BLAS operation acceleration apparatus 200 may perform an accelerated BLAS operation in the embedded system 300 using the OpenCL parameters and the kernel and return the result of the BLAS operation to the machine-learning algorithm 100.

As described above, the GPU-based adaptive BLAS operation acceleration apparatus 200 automatically creates OpenCL parameters and a kernel optimized for the structure of memory in the embedded system 300 and machine-learning data attribute information and internally performs host program configuration and optimization-related functions without user control. Therefore, even though users have no knowledge of the embedded system 300 and OpenCL, the execution of BLAS operations may be accelerated by applying the GPU-based adaptive BLAS operation acceleration apparatus 200 to a machine-learning algorithm.

Hereinafter, the configuration of an apparatus for adaptively accelerating a BLAS operation based on a GPU according to an embodiment of the present invention will be described in more detail with reference to FIGS. 2 to 11.

Figure 2:
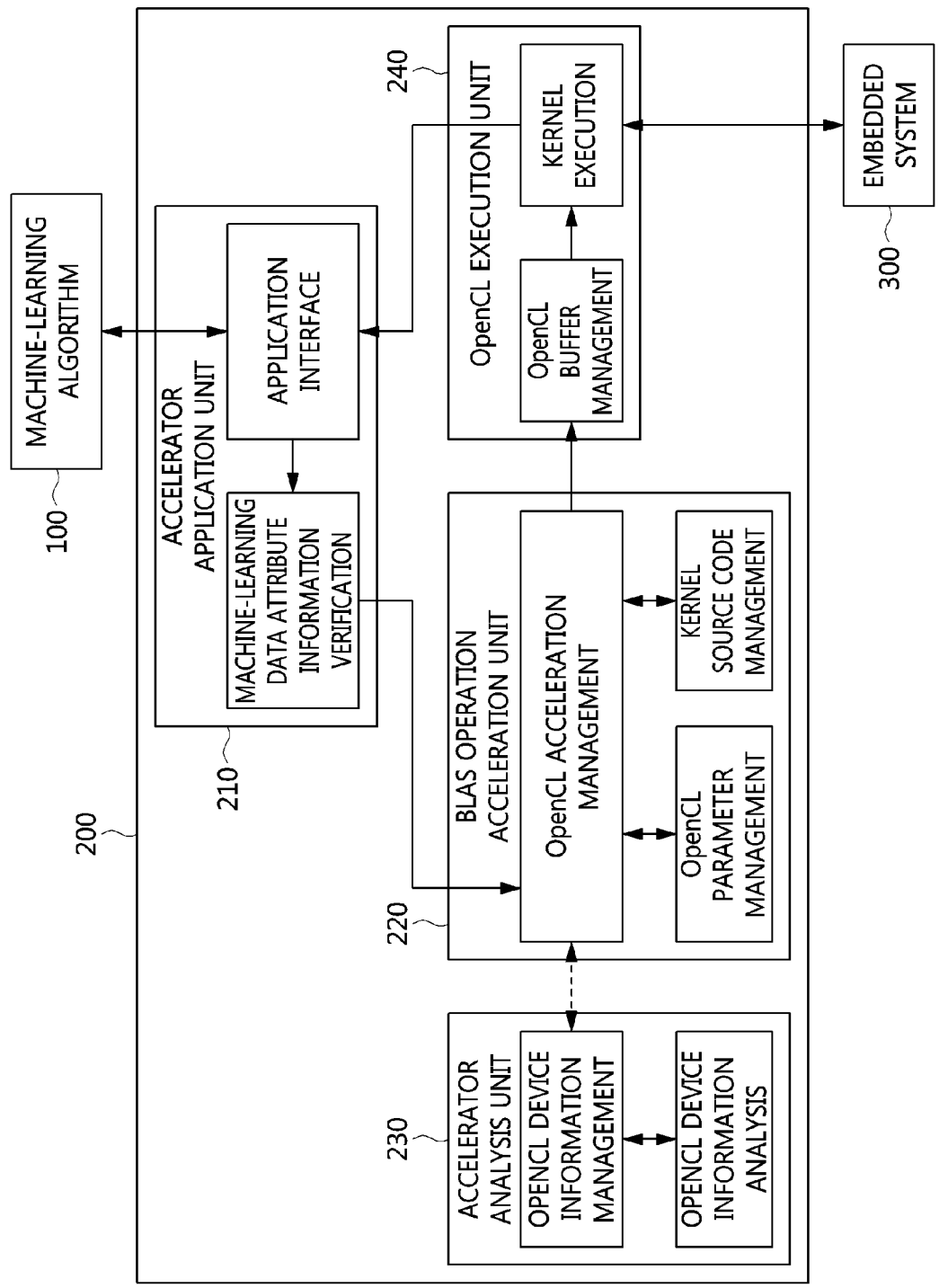
FIG. 2 is a block diagram that shows the configuration of an apparatus for adaptively accelerating a BLAS operation based on a GPU according to an embodiment of the present invention.

FIG. 2 is a block diagram that shows the configuration of an apparatus for adaptively accelerating a BLAS operation based on a GPU according to an embodiment of the present invention.

As illustrated in FIG. 2, the GPU-based adaptive BLAS operation acceleration apparatus 200 includes an accelerator application unit 210, a BLAS operation acceleration unit 220, an accelerator analysis unit 230, and an OpenCL execution unit 240.

When a machine-learning algorithm invokes a BLAS operation in an embedded system, the accelerator application unit 210 delivers machine-learning data attribute information corresponding to the machine-learning algorithm to the BLAS operation acceleration unit 220. Also, the accelerator application unit 210 returns the result of the BLAS operation to the machine-learning algorithm.

The accelerator application unit 210 may verify whether the machine-learning data attribute information is valid. Here, the accelerator application unit 210 determines whether the machine-learning data attribute information matches the size of actual data based on a matrix size and a data type that are input thereto, thereby verifying the validity of the machine-learning data attribute information.

The BLAS operation acceleration unit 220 configures an OpenCL execution environment for the embedded system and creates OpenCL parameters and a kernel based on the machine-learning data attribute information and the OpenCL device information received from the accelerator application unit 210.

Here, the BLAS operation acceleration unit 220 sets optimal OpenCL parameters using the machine-learning data attribute information and the OpenCL device information and compiles kernel source code, thereby creating a kernel in a binary format.

Also, the BLAS operation acceleration unit 220 may select a template for a BLAS operation based on the type of BLAS operation and on the machine-learning data attribute information, create kernel source code corresponding to the OpenCL parameters in the selected template, and create a kernel in a binary format by compiling the kernel source code.

Also, when the OpenCL device supports local memory, the BLAS operation acceleration unit 220 may set the size of data to be copied to the local memory based on the OpenCL parameter representing the size of local memory.

The accelerator analysis unit 230 creates OpenCL device information during the initial analysis process and manages the created OpenCL device information. Here, the OpenCL device information is stored in the local file system of the embedded system, and may be used to set the OpenCL parameters whenever machine learning is performed in the embedded system.

The OpenCL execution unit 240 performs an accelerated BLAS operation through the OpenCL parameters and the kernel and returns the results of the BLAS operations to the machine-learning algorithm via the accelerator application unit 210.

Here, when data of machine learning are constant, the OpenCL execution unit 240 may perform the BLAS operation by reusing the previously created kernel in order to minimize the amount of time taken to perform the BLAS operation.

The OpenCL execution unit 240 creates an OpenCL buffer for a BLAS operation using information about the OpenCL execution environment and the optimal OpenCL parameters and performs the BLAS operation through the kernel using the created OpenCL buffer, thereby accelerating machine learning in the embedded system.

Here, when the application of memory mapping is set, the OpenCL execution unit 240 may enable the CPU of the embedded system to directly access the result of the BLAS operation using a memory-mapping function. Conversely, when the application of memory mapping is not set, the OpenCL execution unit 240 may copy the result of the BLAS operation from the memory area of the GPU to the memory area of the CPU using a buffer read function provided by OpenCL.

Figure 3:
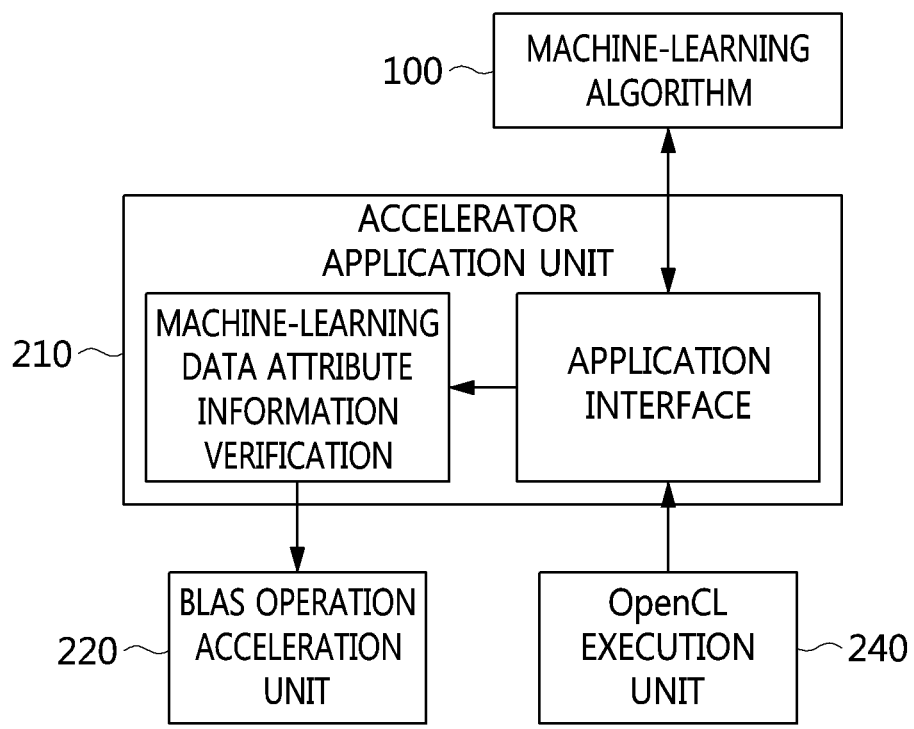
FIG. 3 is a block diagram that shows the configuration of an accelerator application unit according to an embodiment of the present invention.

FIG. 3 is a block diagram that shows the configuration of an accelerator application unit according to an embodiment of the present invention.

As illustrated in FIG. 3, the accelerator application unit 210 may include an application interface module and a machine-learning data attribute information verification module.

The application interface module provides a BLAS API, through which a machine-learning algorithm may invoke a BLAS operation acceleration function, and a device reanalysis API, through which the accelerator analysis unit 230 may arbitrarily reconstruct information about the OpenCL device of the embedded system. The APIs provided by the application interface module may be provided in the form of a single library such that the APIs are easily used in a machine-learning algorithm.

The BLAS API may be invoked whenever a BLAS operation is performed, and may receive the result of the BLAS operation from the OpenCL execution unit 240 and return the final result of the BLAS operation to the machine-learning algorithm.

The BLAS API may accelerate machine learning by minimizing the number of operations and management costs that are unnecessary for machine learning. To this end, the BLAS API may provide BLAS routines, such as SGEMM/DGEMM, SGEMV/DGEMV, SAXPY/DAXPY, SSCAL/DSCAL, SAXPBY/DAXPBY, SDOT/DDOT, SASUM/DASUM, and SCOPY/DCOPY.

Each BLAS API may take the address of source data and machine-learning data attribute information as arguments in order to perform a BLAS operation. The machine-learning data attribute information includes a value for detecting the size of a matrix and a value for scalar multiplication. Also, the machine-learning data attribute information may further include information about whether the input matrix is a transpose matrix for certain BLAS operations, such as SGEMM/DGEMM, SGEMV/DGEMV, and the like.

That is, the machine-learning data attribute information may be selectively configured based on the type of a BLAS operation. For example, in the case of SAXPY (or DAXPY), the operation such as $Y=\alpha X+Y$ (where X and Y are vectors having the size of M) is performed, and machine-learning data attribute information may include the scalar value $\alpha$ and the vector size M.

In the case of SGEMM (or DGEMM), the operation such as $C=\alpha AB+\beta C$ (where A, B and C are matrices) is performed, and machine-learning data attribute information may include the scalar values $\alpha$ and $\beta$, M, N and K for detecting the size of matrices A, B and C, and information about whether the input matrices (matrices A and B) are transpose matrices. Here, the size of matrix A is assumed to be M*K, the size of matrix B is assumed to be K*N, and the size of matrix C is assumed to be M*N.

The machine-learning data attribute information verification module of the accelerator application unit 210 verifies whether the machine-learning data attribute information input via the application interface module is valid. Here, the machine-learning data attribute information verification module determines whether the received data attribute information matches the size of actual data (bytes) using the input matrix size values (M, N and K) and the data type (float or double), thereby verifying the validity of the machine-learning data attribute information.

When it is determined that the received data attribute information matches the size of actual data, the machine-learning data attribute information verification module delivers the machine-learning data attribute information to the BLAS operation acceleration unit 220. Conversely, when it is determined that the received data attribute information does not match the size of actual data, the machine-learning data attribute information verification module may return an error code (−1) to the machine-learning algorithm via the application interface module.

Figure 4:
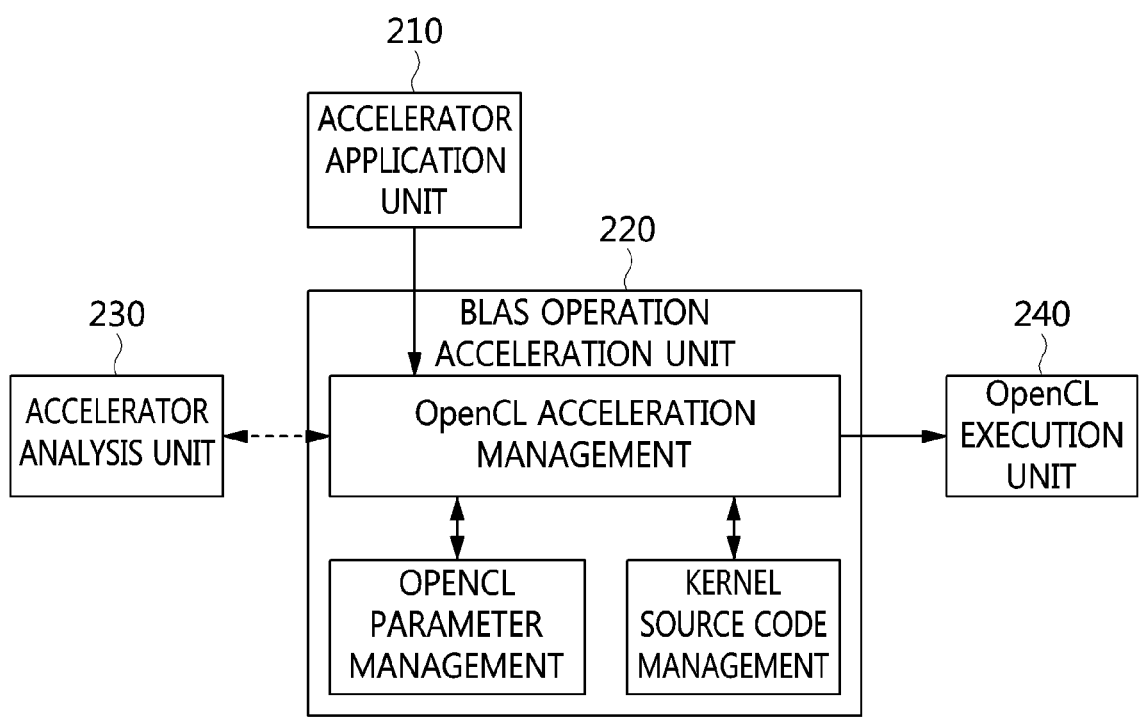
FIG. 4 is a block diagram that shows the configuration of a BLAS operation acceleration unit according to an embodiment of the present invention.

FIG. 4 is a block diagram that shows the configuration of a BLAS operation acceleration unit according to an embodiment of the present invention.

As shown in FIG. 4, the BLAS operation acceleration unit 220 may include an OpenCL acceleration management module, an OpenCL parameter management module, and a kernel source code management module.

When it has not acquired OpenCL device information from the accelerator analysis unit 230 or when a device reanalysis API is invoked, the OpenCL acceleration management module may perform an initial analysis process.

When the device reanalysis API is invoked or when OpenCL device information is not stored in the OpenCL parameter management module because the OpenCL acceleration management module is being executed for the first time, the BLAS operation acceleration unit 220 may request OpenCL device information from the accelerator analysis unit 230. The OpenCL acceleration management module may receive OpenCL device information from the accelerator analysis unit 230.

Also, the OpenCL acceleration management module may deliver the OpenCL device information, acquired from the accelerator analysis unit 230, and the machine-learning data attribute information, received from the accelerator application unit 210, to the OpenCL parameter management module, and may receive OpenCL parameters, optimized for the embedded system and machine-learning data, from the OpenCL parameter management module.

The OpenCL acceleration management module may create an OpenCL execution environment optimized for the embedded system. Here, the OpenCL acceleration management module may create an OpenCL execution environment through an OpenCL platform creation process, an OpenCL device creation process, a context creation process, and a command queue creation process.

Here, because the OpenCL execution environment created by the OpenCL acceleration management module may be used regardless of the type of BLAS operation, the OpenCL acceleration management module may perform the process of creating an OpenCL execution environment only once when it is first executed.

Also, the OpenCL acceleration management module acquires kernel source code for performing a BLAS operation from the OpenCL source code management module and creates a kernel. The OpenCL acceleration management module transforms the kernel source code into a binary format by compiling the same and caches the kernel in a binary format to the memory of the current device. When a BLAS operation is performed for a matrix having the same size, the OpenCL acceleration management module may reuse the cached kernel.

When the size of data of machine learning is constant, the OpenCL acceleration management module compiles kernel source code only when the first BLAS operation is performed and reuses the cached kernel for BLAS operations subsequent thereto, thereby minimizing the amount of time taken to perform BLAS operations.

The OpenCL acceleration management module delivers information about the OpenCL execution environment, including the context and the command queue, the OpenCL parameters, and the kernel to the OpenCL execution unit 240, thereby performing the BLAS operation.

The OpenCL parameter management module creates OpenCL parameters optimized for the embedded system using the OpenCL device information and the machine-learning data attribute information. The OpenCL parameter management module may create OpenCL parameters for at least one of a vector grouping number, a work group size, information about whether to apply memory mapping, information about whether an OpenCL device supports a unified memory structure, information about whether an OpenCL device supports local memory, and a local memory size.

Among the OpenCL parameters, the vector grouping number is used to set the number of matrix elements to be included in a vectorized group when an operation is performed by grouping some elements of a matrix as a vector in order to minimize the number of accesses to memory and the operation cost while a BLAS operation is being performed. The vector grouping number may be set to 4, 8, 16, or the like, and may be set depending on the value of CL_KERNEL_PREFERRED_WORK_GROUP_SIZE_MULTIPLE in the OpenCL device information.

The OpenCL parameter management module may select the matrices to be grouped depending on whether a BLAS operation includes multiplication of matrices, scalar multiplication of a matrix, or addition of matrices when it performs the BLAS operation. When multiplication of matrices A and B is performed, the GPU-based adaptive BLAS operation acceleration apparatus 200 groups certain elements in the same row in matrix B as a single vector depending on the vector grouping number, thereby multiplying the vector by each element in matrix A. Accordingly, each row of matrix C, which is the result of an operation performed on the two matrices A and B according to an embodiment of the present invention, is calculated in a single kernel in the GPU, whereby the workload of each kernel may be maximized.

Figure 5:
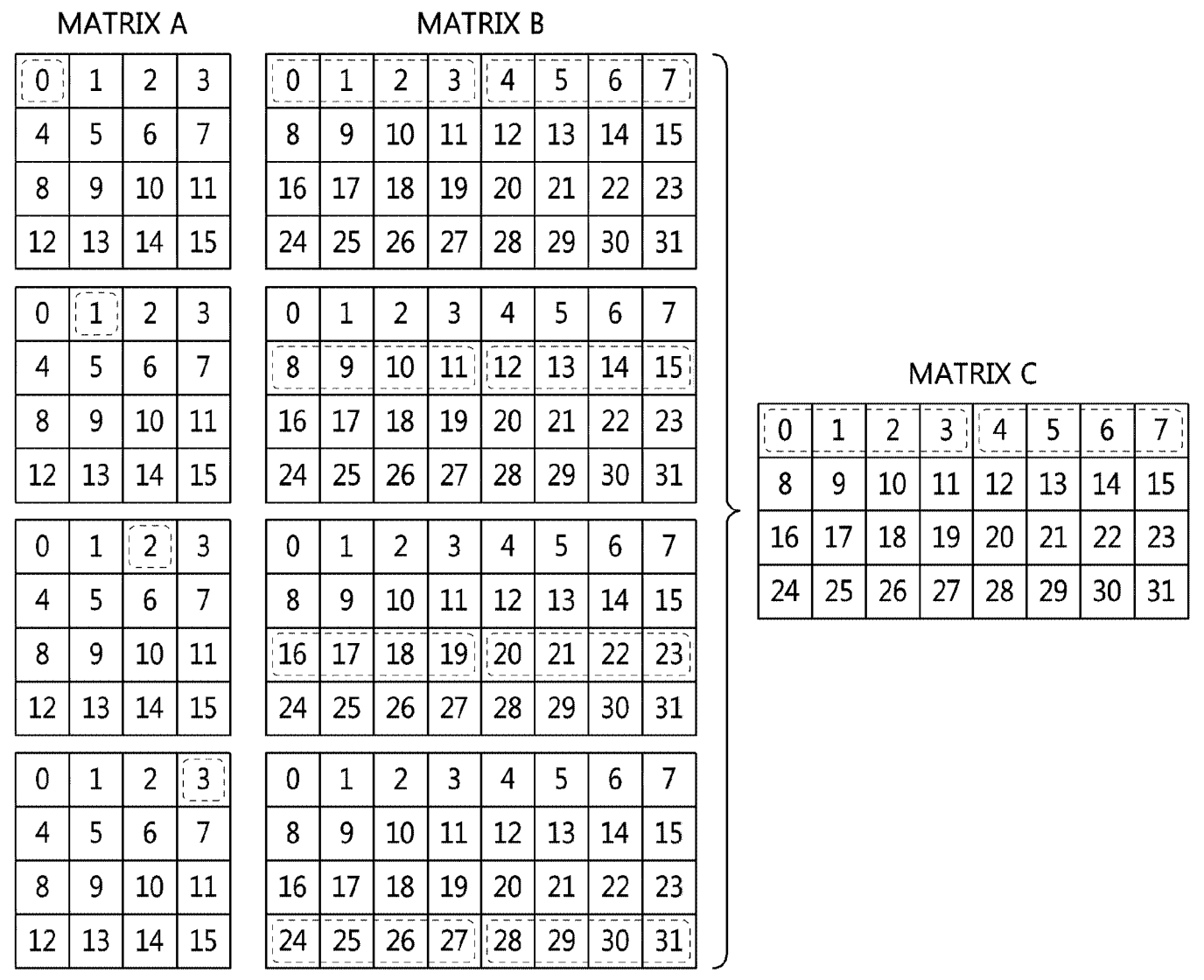

FIG. 5 is an exemplary view that shows the process of multiplying matrices according to an embodiment of the present invention.

As illustrated in FIG. 5, assume that a vector grouping number is 4, M is 4, N is 8, and K is 4. That is, the size of matrix A is 4×4, and the size of matrix B is 4×8. When the first row of matrix C is calculated by multiplying matrix A by matrix B based on a vectorized group in FIG. 5, eight operation processes are performed in a single kernel, whereby the first row of matrix C, which is the result of multiplication of matrix A and matrix B, may be calculated.

When scalar multiplication of a matrix, that is, the operation αA (where α is a scalar value, and A is a matrix), is performed, certain elements in the same row in matrix A are grouped as a single vector depending on the vector grouping number, and the vector may be multiplied by the scalar value α.

Figures 6, 7:
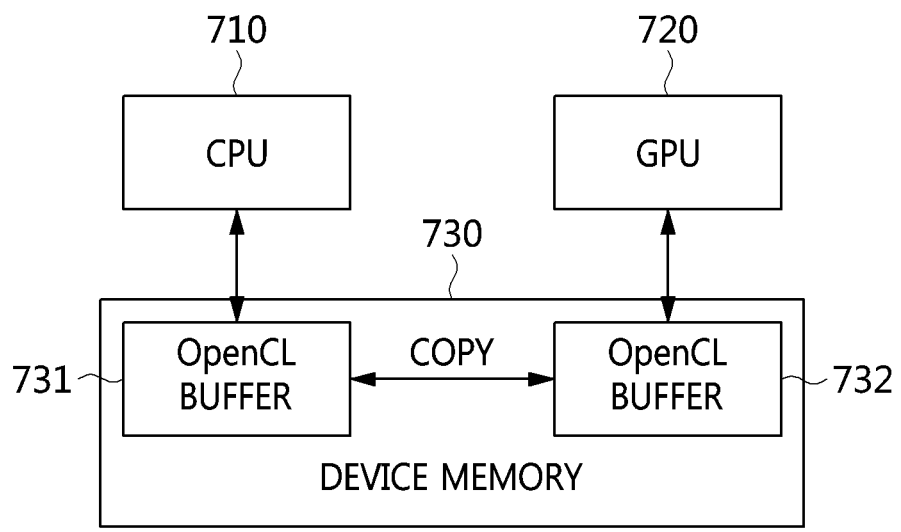
FIG. 6 is an exemplary view that shows the process of adding matrices according to an embodiment of the present invention.
FIG. 7 is an exemplary view that shows a general BLAS operation in a unified memory structure.

Also, the process of adding matrix A and matrix B is as shown in FIG. 6.

FIG. 6 is an exemplary view that shows the process of adding matrices according to an embodiment of the present invention.

In FIG. 6, elements in the same row in matrix A and matrix B are respectively grouped as a single vector depending on the vector grouping number, and an addition operation may be performed for the vectorized groups.

In FIG. 6, it is assumed that the vector grouping number is 4, and that M, N and K are 4. That is, the size of matrix A is 4×4, and the size of matrix B is 4×4.

As illustrated in FIG. 6, the addition of matrix A and matrix B is performed based on vectorized groups, whereby the first row of matrix C may be calculated. The addition of matrices may be performed in such a way that the first row of matrix C is calculated through a single operation process in a single kernel.

Among the OpenCL parameters, the work group size may be categorized into the size of a local work group and the size of a global work group. The size of a local work group may be set based on the following Equation (1), and the size of a global work group may be set based on the following Equation (2):

$$LocalWorkSize\ (i, j) = \left(\frac{G}{2}, \frac{G}{2}\right) \quad (1)$$

$$GlobalWorkSize\ (i, j) = \Big(RoundUp(M, LocalWorkSize(i)), \quad (2)$$
$$Roundup\Big(\frac{N-1}{G} + 1, LocalWorkSize(j)\Big)\Big)$$

Because the GPU-based adaptive BLAS operation acceleration apparatus 200 according to an embodiment of the present invention executes a kernel by configuring a matrix in the form of a two-dimensional space index, the size of a local work group and the size of a global work group have the values i and j, which respectively denote a row and a column in the two-dimensional space.

In Equation (1) and Equation (2), G denotes the vector grouping number, M and N are parameters representing the size of a matrix, among the machine-learning data attribute information, and RoundUp (A, B) shown in Equation (2) is a function for rounding the value of A up to the nearest multiple of B in order to make the remainder of division of A by B zero when the remainder is not zero.

Among the OpenCL parameters, the parameter representing whether to apply memory mapping is used to minimize the expense of copying machine-learning data between a CPU, which is a host processor in the embedded system, and a GPU for executing a kernel. The parameter representing whether to apply memory mapping may be set using the value of CL_DEVICE_HOST_UNIFIED_MEMORY in the OpenCL device information. If the value of CL_DEVICE_HOST_UNIFIED_MEMORY is CL_TRUE, the parameter representing whether to apply memory mapping is set to TRUE, but if not, the corresponding parameter is set to FALSE.

Figure 8:
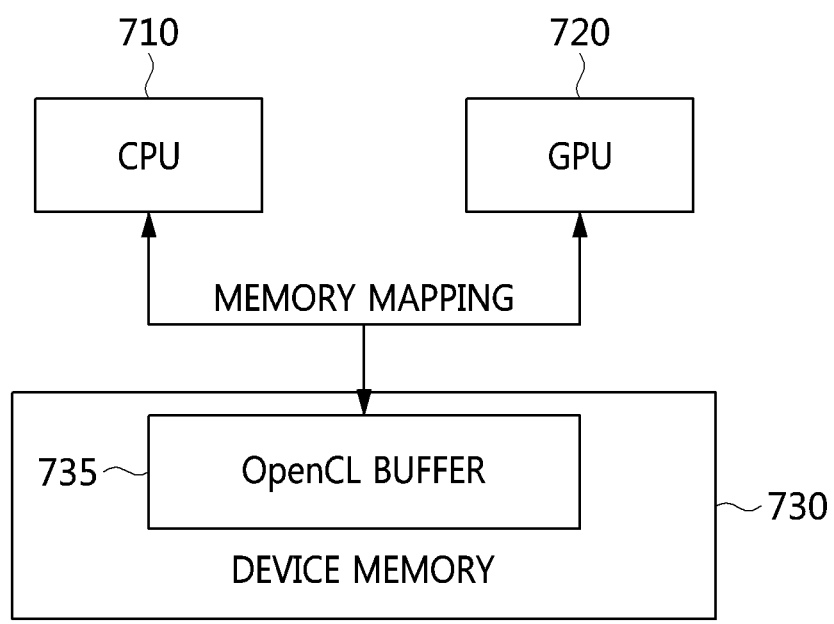
FIG. 8 is an exemplary view that shows a BLAS operation using a memory-mapping method in a unified memory structure.

FIG. 7 is an exemplary view that shows a general BLAS operation to which a memory-mapping method is not applied in a unified memory structure, and FIG. 8 is an exemplary view that shows a BLAS operation to which a memory-mapping method is applied in a unified memory structure.

As illustrated in FIG. 7, because a unified memory structure is configured such that a CPU 710 and a GPU 720 share a single memory structure 730 therebetween, it is unnecessary to copy data stored in the OpenCL buffer 731 created by the CPU 710 to the OpenCL buffer 732 of the GPU 720.

Therefore, the GPU-based adaptive BLAS operation acceleration apparatus 200 according to an embodiment of the present invention checks, using the OpenCL device information, whether the current embedded system supports a unified memory structure. When it is determined that a unified memory structure is supported, the GPU-based adaptive BLAS operation acceleration apparatus 200 automatically creates a host program to which memory mapping is applied through the OpenCL execution unit 240, thereby enabling the GPU 720 to directly access the OpenCL buffer 735 created by the CPU 710, as shown in FIG. 8.

Among the OpenCL parameters, the parameter representing whether the OpenCL device supports local memory is used to minimize the expense of access to memory when a kernel is executed in the GPU. The memory of the OpenCL device is divided into global memory and local memory. The global memory may be accessed by all work items in each work group, but the processing speed is low compared to local memory. Therefore, in order to maximize the operation performance of a kernel in OpenCL, an operation is generally performed in the state in which data to be accessed by work items in a single work group are copied to local memory.

However, depending on the chipset vendor of the embedded system, the performance of local memory may be worse than the performance of global memory, in which case a BLAS operation using the local memory may degrade operation performance.

In order to solve this problem, the GPU-based adaptive BLAS operation acceleration apparatus 200 according to an embodiment of the present invention sets a parameter representing whether the OpenCL device supports local memory. Based on the parameter representing whether the OpenCL device supports local memory, the kernel source management module may automatically create kernel source code optimized for the current embedded system.

Here, the parameter representing whether the OpenCL device supports local memory may be set based on the value of CL_DEVICE_LOCAL_MEM_TYPE in the OpenCL device information. When the value of CL_DEVICE_LOCAL_MEM_TYPE is CL_LOCAL, the parameter representing whether the OpenCL device supports local memory is set to TRUE, but when the value of CL_DEVICE_LOCAL_MEM_TYPE is CL_GLOBAL, the corresponding parameter is set to FALSE.

Among the OpenCL parameters, the parameter representing the size of local memory in the OpenCL device is used to set the size of data to be copied to local memory. This parameter may be used when the value of the parameter representing whether the OpenCL device supports local memory is TRUE.

The parameter representing the size of local memory in the OpenCL device is set using the value of CL_DEVICE_LOCAL_MEM_SIZE in the OpenCL device information, and the parameter may have a value in units of KB. For example, when the size of local memory is 32 KB, the parameter representing the size of local memory in the OpenCL device is set to 32.

Describing again the kernel source code management module in FIG. 4, the kernel source code management module automatically creates kernel source code optimized for the current OpenCL device based on a predefined kernel source code template and transmits the created kernel source code to the OpenCL acceleration management module.

The kernel source code management module may receive information about the type of the BLAS operation to be performed, the machine-learning data attribute information, the OpenCL parameters, and the like from the OpenCL acceleration management module. Here, the OpenCL parameters may include a vector grouping number, the size of a work group, information about whether the OpenCL device supports local memory, and the size of local memory in the OpenCL device. Here, the size of local memory in the OpenCL device may be received only when the value of the parameter representing whether the OpenCL device supports local memory is TRUE.

The kernel source code management module selects a template suitable for a BLAS operation, selects vector grouping source code suitable for the vector grouping number in the selected template, sets the size of local memory available for each kernel based on the size of local memory in the OpenCL device, and creates kernel source code by reflecting the size of the corresponding local memory. Then, the kernel source code management module delivers the kernel source code in the type of String, which is the final source code of the template, to the OpenCL acceleration management module. Here, the OpenCL acceleration management module may receive the kernel source code and compile the same.

When it selects a template, the kernel source code management module may select a template suitable for the BLAS operation to be performed based on the type of the corresponding BLAS operation and on the machine-learning data attribute information. The kernel source code management module may select vector grouping source code that is suitable for the set vector grouping number in the selected template, and the vector grouping source code may be divided based on the vector grouping number using a preprocessing directive.

In the GPU-based adaptive BLAS operation acceleration apparatus 200 according to an embodiment of the present invention, vector grouping may be performed in such a way that matrix data grouped as vectors are loaded or stored using vloadn and vstoren, which are the built-in vector functions of OpenCL, in which case n, which is the number of elements in a vector in vloadn and vstoren, may be set using the vector grouping number.

When the parameter representing whether the OpenCL device supports local memory is set to TRUE, the kernel source code management module sets the size of local memory available for each kernel in consideration of at least one of the size of a work group and the size of the local memory in the OpenCL device and reflects the set size of the local memory to the template, thereby creating kernel source code in which the local memory is used.

Figure 9:
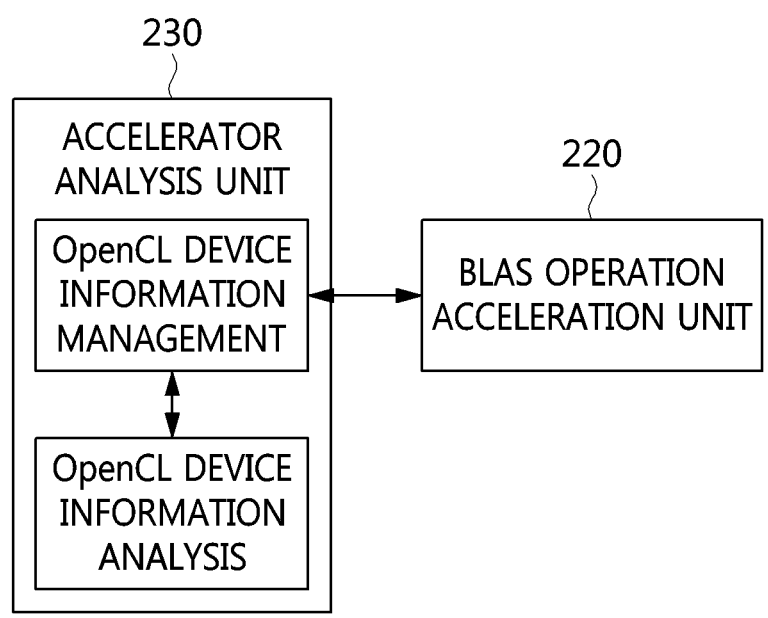
FIG. 9 is a block diagram that shows the configuration of an accelerator analysis unit according to an embodiment of the present invention.

FIG. 9 is a block diagram that shows the configuration of an accelerator analysis unit according to an embodiment of the present invention.

As shown in FIG. 9, the accelerator analysis unit 230 includes an OpenCL device information management module and an OpenCL device information analysis module.

The accelerator analysis unit 230 of the GPU-based adaptive BLAS operation acceleration apparatus 200 may operate only when it receives a request for analysis from the BLAS operation acceleration unit 220. The accelerator analysis unit 230 may be configured with the OpenCL device information management module and the OpenCL device information analysis module.

The OpenCL device information management module constructs and manages OpenCL device information using the OpenCL device information analysis module and delivers the OpenCL device information to the BLAS operation acceleration unit 220. Here, the OpenCL device information management module may construct OpenCL device information using the OpenCL device information analysis module when OpenCL device information has not been constructed or when a device reanalysis API is invoked.

When machine learning is performed in the same embedded system, because the hardware configuration thereof is not changed, the OpenCL device information is not changed. Therefore, it is not necessary to analyze OpenCL device information whenever machine learning is performed. That is, when the OpenCL device information is already constructed and when the device reanalysis API is not invoked, the OpenCL device information management module may read the stored information from the file, which is stored in the local file system of the current embedded system, and deliver the read information to the BLAS operation acceleration unit 220.

The OpenCL device information analysis module analyzes information about the OpenCL device of the embedded system, illustrated in FIG. 10, in order to create OpenCL parameters and a kernel optimized for the current embedded system.

FIG. 10 is an exemplary view that shows OpenCL device information according to an embodiment of the present invention.

As illustrated in FIG. 10, the OpenCL device information analyzed by the OpenCL device information analysis module may include at least one of CL_PLATFORM_VERSION (OpenCL version information), CL_DEVICE_TYPE (device type), CL_DEVICE_HOST_UNIFIED_MEMORY (whether a unified memory structure is supported), CL_DEVICE_MAX_WORK_ITEM_DIMENSIONS (the maximum number of dimensions in the index space), CL_DEVICE_LOCAL_MEM_TYPE (whether local memory is supported), CL_DEVICE_LOCAL_MEM_SIZE (the size of local memory) and CL_KERNEL_PREFERRED_WORK_GROUP_SIZE_MULTIPLE (the preferred multiple of a work group size).

Here, CL_PLATFORM_VERSION, CL_DEVICE_TYPE, and CL_DEVICE_MAX_WORK_ITEM_DIMENSIONS may be used to check whether the GPU-based adaptive BLAS operation acceleration function according to an embodiment of the present invention can be used in the current embedded system. For example, when the value of CL_PLATFORM_VERSION is 1.1 or lower, when the value of CL_DEVICE_TYPE is not GPU, or when the value of CL_DEVICE_MAX_WORK_ITEM_DIMENSIONS is less than 2, it is determined that the GPU-based adaptive BLAS operation acceleration function according to an embodiment of the present invention cannot be used, and thus an error code (−1) may be returned.

Figure 11:
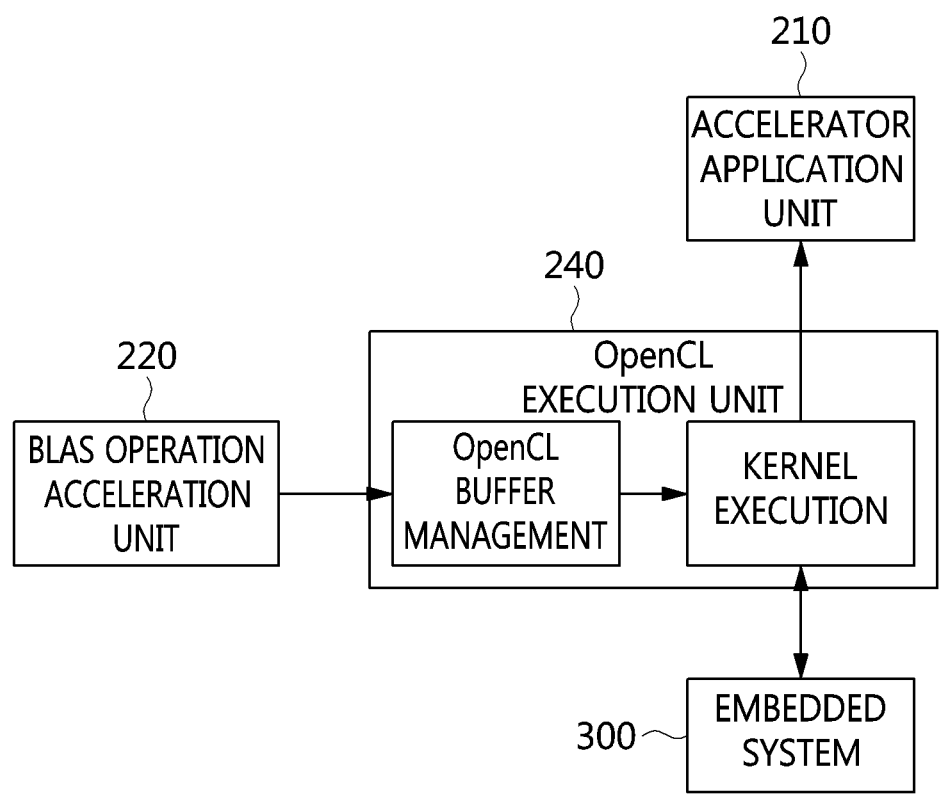
FIG. 11 is a block diagram that shows the configuration of an OpenCL execution unit according to an embodiment of the present invention.

FIG. 11 is a block diagram that shows the configuration of an OpenCL execution unit according to an embodiment of the present invention.

As illustrated in FIG. 11, the OpenCL execution unit includes an OpenCL buffer management module and a kernel execution module.

The OpenCL buffer management module may create an OpenCL buffer for a BLAS operation using information about the OpenCL execution environment and the OpenCL parameters, delivered from the BLAS operation acceleration unit 220, and deliver information about the created OpenCL buffer to the kernel.

Here, when the parameter representing whether to apply memory mapping is set to TRUE, the OpenCL buffer management module creates an OpenCL buffer such that memory mapping is applied, and enables a GPU to directly access the OpenCL buffer created by a CPU using the memory-mapping function of OpenCL.

The kernel execution module performs a BLAS operation using the GPU of the embedded system and delivers the result of the BLAS operation to the accelerator application unit 210. Here, when the parameter representing whether to apply memory mapping is set to TRUE, the CPU may directly access the result of the BLAS operation using a memory-mapping function. Conversely, when the parameter representing whether to apply memory mapping is set to FALSE, the result of the BLAS operation, stored in the memory area of the GPU, may be copied to the memory area of the CPU using a buffer read function of OpenCL.

Hereinafter, a method for adaptively accelerating a BLAS operation based on a GPU performed by a GPU-based adaptive BLAS operation acceleration apparatus according to an embodiment of the present invention will be described in more detail with reference to FIG. 12.

Figure 12:
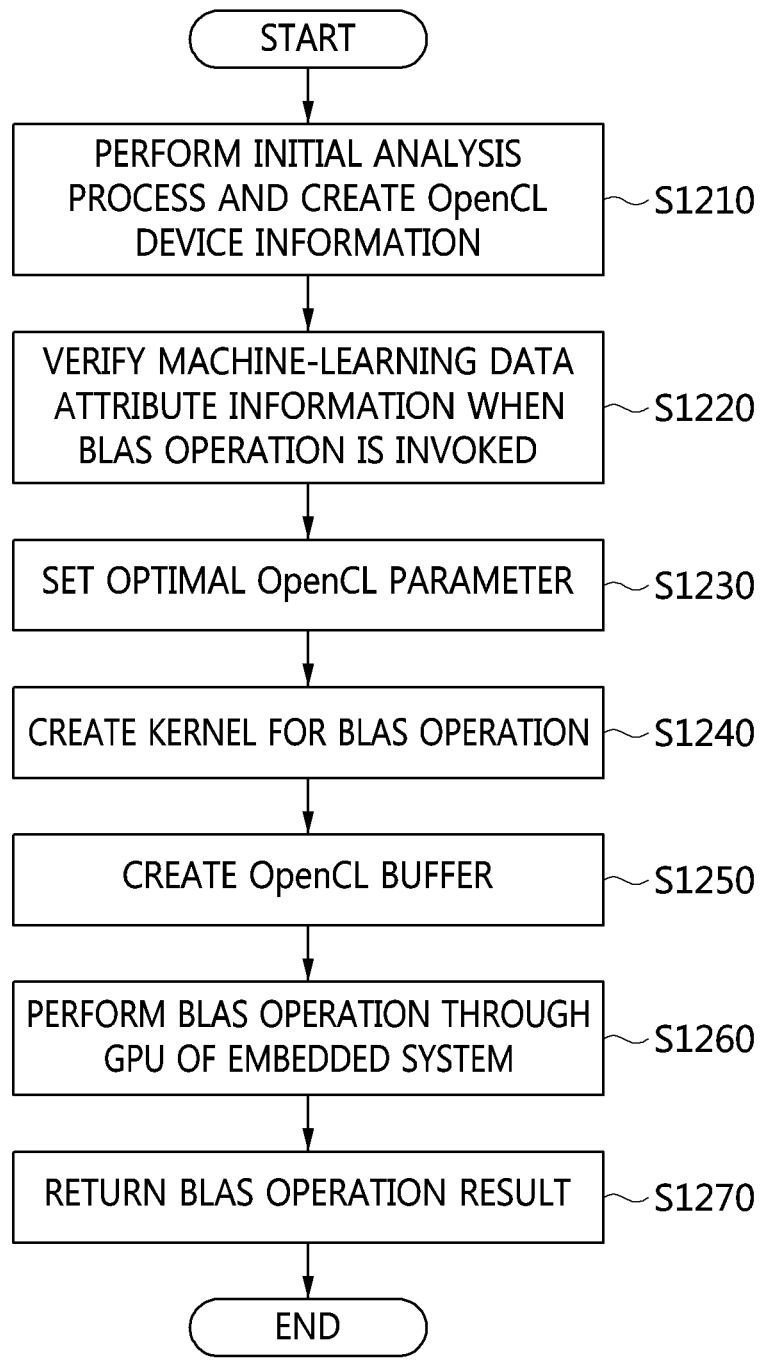
FIG. 12 is a flowchart for explaining a method for adaptively accelerating a BLAS operation based on a GPU according to an embodiment of the present invention.

FIG. 12 is a flowchart for explaining a method for adaptively accelerating a BLAS operation based on a GPU according to an embodiment of the present invention.

First, the GPU-based adaptive BLAS operation acceleration apparatus 200 performs an initial analysis process and creates OpenCL device information at step S1210.

When an OpenCL device, which is an accelerator, has not been analyzed, or when an OpenCL device reanalysis API is invoked, the GPU-based adaptive BLAS operation acceleration apparatus 200 may perform the initial analysis process. When the initial analysis process is performed, the GPU-based adaptive BLAS operation acceleration apparatus 200 may create and manage OpenCL device information.

Then, the GPU-based adaptive BLAS operation acceleration apparatus 200 verifies machine-learning data attribute information at step S1220 when a BLAS operation is invoked.

When the machine-learning algorithm of the embedded system invokes a BLAS operation, the GPU-based adaptive BLAS operation acceleration apparatus 200 verifies the validity of the machine-learning data attribute information corresponding to the machine-learning algorithm. Here, the GPU-based adaptive BLAS operation acceleration apparatus 200 determines whether the machine-learning data attribute information matches the size of actual data based on the input matrix size and data type, thereby verifying the validity of the machine-learning data attribute information.

Then, the GPU-based adaptive BLAS operation acceleration apparatus 200 sets optimal OpenCL parameters at step S1230 and creates a kernel for the BLAS operation at step S1240.

The GPU-based adaptive BLAS operation acceleration apparatus 200 may configure an OpenCL execution environment for the embedded system based on the OpenCL device information and the machine-learning data attribute information, the validity of which is verified, and may create optimal OpenCL parameters and a kernel.

Here, the GPU-based adaptive BLAS operation acceleration apparatus 200 may select a template for the BLAS operation based on the type thereof and the machine-learning data attribute information, create kernel source code corresponding to the OpenCL parameters in the selected template, and create a kernel in a binary format by compiling the kernel source code.

Then, the GPU-based adaptive BLAS operation acceleration apparatus 200 creates an OpenCL buffer at step S1250.

The GPU-based adaptive BLAS operation acceleration apparatus 200 creates an OpenCL buffer for the BLAS operation using information about the OpenCL execution environment and the optimal OpenCL parameters.

Also, the GPU-based adaptive BLAS operation acceleration apparatus 200 performs the BLAS operation using the GPU of the embedded system at step S1260.

The GPU-based adaptive BLAS operation acceleration apparatus 200 delivers information about the created OpenCL buffer to the kernel, thereby performing the BLAS operation using the kernel. Accordingly, the GPU-based adaptive BLAS operation acceleration apparatus 200 according to an embodiment of the present invention may accelerate machine learning in the embedded system.

Finally, the GPU-based adaptive BLAS operation acceleration apparatus 200 returns the result of the BLAS operation to the machine-learning algorithm at step S1270.

When the parameter representing whether to apply memory mapping is set to TRUE, the GPU-based adaptive BLAS operation acceleration apparatus 200 may enable the CPU of the embedded system to directly access the result of the BLAS operation using a memory-mapping function.

Conversely, when the parameter representing whether to apply memory mapping is not set to TRUE, the GPU-based adaptive BLAS operation acceleration apparatus 200 may copy the result of the BLAS operation from the memory area of the GPU to the memory area of the CPU using the buffer read function of OpenCL.

According to the present invention, machine learning may be accelerated in an embedded system.

Also, according to the present invention, OpenCL parameters and a kernel optimized for an embedded system and the type of BLAS operation are automatically created, whereby laypeople may apply a BLAS operation acceleration function to a machine-learning algorithm.

Also, according to the present invention, host program configuration and optimization-related functions are internally performed without user control, whereby laypeople may apply a BLAS operation acceleration function to a machine-learning algorithm.

As described above, the apparatus and method for adaptively accelerating a BLAS operation based on a GPU according to the present invention are not limitedly applied to the configurations and operations of the above-described embodiments, but all or some of the embodiments may be selectively combined and configured, so that the embodiments may be modified in various ways.

What is claimed is:

1. An apparatus for adaptively accelerating a Basic Linear Algebra Subprograms (BLAS) operation performed using a Graphics Processing Unit (GPU) in an embedded system, the apparatus comprising:
a BLAS operation acceleration unit for:
setting optimal OpenCL parameters using machine-learning data attribute information corresponding to a machine learning algorithm and OpenCL device information corresponding to the GPU, and
creating, using the optimal OpenCL parameters, a kernel in a binary format by compiling kernel source code;
an OpenCL execution unit for:
creating an OpenCL buffer for a BLAS operation using information about an OpenCL execution environment and the optimal OpenCL parameters, and
accelerating the BLAS operation invoked by the machine learning algorithm by executing the kernel using the GPU in such a way that the GPU accesses the created OpenCL buffer in order to perform the BLAS operation; and
an accelerator application unit for returning a result of the BLAS operation to the machine-learning algorithm,
wherein the optimal OpenCL parameter includes a parameter for at least one of information about whether a unified memory structure is supported, information about whether local memory is supported, and a size of local memory,
wherein the BLAS operation acceleration unit automatically creates kernel source code optimized for the current embedded system based on the parameter representing whether the OpenCL device supports local memory and a unified memory,
wherein the OpenCL execution unit enables a CPU of the embedded system to directly access the result of the BLAS operation using a memory-mapping function when the OpenCL device supports a unified memory, and
wherein the BLAS operation acceleration unit sets the size of data to be copied to the local memory based on the optimal OpenCL parameter representing the size of local memory when the OpenCL device supports local memory.

2. The apparatus of claim 1, further comprising:
an accelerator analysis unit for creating the OpenCL device information when an initial analysis process is performed,
wherein the OpenCL device information is stored a local file system of the embedded system and is used to set the OpenCL parameters whenever the machine learning is performed in the embedded system.

3. The apparatus of claim 1, wherein the accelerator application unit determines whether the machine-learning data attribute information matches a size of actual data based on a matrix size value and a data type input thereto, and thereby verifies validity of the machine-learning data attribute information.

4. The apparatus of claim 3, wherein the machine-learning data attribute information includes at least one of a matrix-size-setting argument, a scalar value, and information about whether a matrix is a transpose matrix, and varies depending on a type of the BLAS operation.

5. The apparatus of claim 1, wherein the OpenCL parameters include a parameter for at least one of a vector grouping number, a size of a work group, information about whether to apply memory mapping, information about whether a unified memory structure is supported, information about whether local memory is supported, and a size of local memory.

6. The apparatus of claim 1, wherein the OpenCL execution unit copies the result of the BLAS operation from a memory area of the GPU to a memory area of the CPU using a buffer read function of OpenCL when application of memory mapping is not set.

7. The apparatus of claim 5, wherein the BLAS operation acceleration unit selects a template for the BLAS operation based on a type of the BLAS operation and on the machine-learning data attribute information, creates the kernel source code corresponding to the OpenCL parameters in the selected template, and creates the kernel in a binary format by compiling the kernel source code.

8. The apparatus of claim 7, wherein, when data of machine learning are constant, the OpenCL execution unit reuses the previously created kernel in order to minimize an amount of time taken to perform the BLAS operation.

9. An apparatus for adaptively accelerating a Basic Linear Algebra Subprograms (BLAS) operation performed using a GPU in an embedded system, comprising:
an accelerator application unit for delivering machine-learning data attribute information corresponding to a machine-learning algorithm to a BLAS operation acceleration unit when the machine-learning algorithm invokes a BLAS operation;
the BLAS operation acceleration unit for:
configuring an OpenCL execution environment based on the machine-learning data attribute information received from the accelerator application unit, and on OpenCL device information corresponding to the GPU, and
creating, based on the machine-learning data attribute information and the OpenCL device information, OpenCL parameters and a kernel, including creating the kernel in a binary format by compiling kernel source code; and
an OpenCL execution unit for:
perform the BLAS operation, accelerated by the GPU through the use of the OpenCL parameters and the kernel, and
returning a result of performing the BLAS operation to the machine-learning algorithm through the accelerator application unit,
wherein the optimal OpenCL parameter includes a parameter for at least one of information about whether a unified memory structure is supported, information about whether local memory is supported, and a size of local memory,
wherein the BLAS operation acceleration unit automatically creates kernel source code optimized for the current embedded system based on the parameter representing whether the OpenCL device supports local memory and a unified memory,
wherein the OpenCL execution unit enables a CPU of the embedded system to directly access the result of the BLAS operation using a memory-mapping function when the OpenCL device supports a unified memory, and
wherein the BLAS operation acceleration unit sets the size of data to be copied to the local memory based on the optimal OpenCL parameter representing the size of local memory when the OpenCL device supports local memory.

10. A method for adaptively accelerating a Basic Linear Algebra Subprograms (BLAS) operation performed using a GPU, performed by an embedded system, the method comprising:
setting optimal OpenCL parameters using machine-learning data attribute information of a machine-learning algorithm and OpenCL device information of the GPU, wherein the optimal OpenCL parameter includes a parameter for at least one of information about whether a unified memory structure is supported, information about whether local memory is supported, and a size of local memory;
automatically creating kernel source code optimized for the current embedded system based on the parameter representing whether the OpenCL device supports local memory and a unified memory;
creating, using the machine-learning data attribute information and the OpenCL device information, a kernel in a binary format by compiling kernel source code;
creating an OpenCL buffer for a BLAS operation using information about an OpenCL execution environment and the optimal OpenCL parameters;
accelerating the machine learning algorithm by performing, using the GPU and the kernel, the BLAS operation, wherein the GPU accesses the OpenCL buffer in order to perform the BLAS operation; and
returning a result of the BLAS operation to the machine-learning algorithm,
wherein setting optimal OpenCL parameters comprises:
setting the size of data to be copied to the local memory based on the optimal OpenCL parameter representing the size of local memory when the OpenCL device supports local memory, and
wherein returning the result of the BLAS operation is configured to enable a CPU of the embedded system to directly access the result of the BLAS operation using a memory-mapping function when the OpenCL device supports a unified memory.

11. The method of claim 10, wherein the OpenCL device information is created when an initial analysis process is performed, is stored in a local file system of the embedded system, and is used to set the OpenCL parameters whenever the machine learning is performed in the embedded system.

12. The method of claim 10, wherein the machine-learning data attribute information includes at least one of a matrix-size-setting argument, a scalar value, and information about whether a matrix is a transpose matrix, and varies depending on a type of the BLAS operation.

13. The method of claim 10, further comprising:
determining whether the machine-learning data attribute information matches a size of actual data based on an input matrix size value and an input data type, and thereby verifying validity of the machine-learning data attribute information.

14. The method of claim 10, wherein the OpenCL parameters include a parameter for at least one of a vector grouping number, a size of a work group, information about whether to apply memory mapping, information about whether a unified memory structure is supported, information about whether local memory is supported, and a size of local memory.

15. The method of claim 10, wherein returning the result of the BLAS operation is configured to copy the result of the BLAS operation from a memory area of the GPU to a memory area of the CPU using a buffer read function of OpenCL when application of memory mapping is not set.

16. The method of claim 14, wherein creating the kernel in a binary format comprises:
- selecting a template for the BLAS operation based on a type of the BLAS operation and the machine-learning data attribute information;
- creating the kernel source code corresponding to the OpenCL parameters in the selected template; and
- creating the kernel in a binary format by compiling the kernel source code.

17. The method of claim 16, wherein, when data of machine learning are constant, the previously created kernel is reused in order to minimize an amount of time taken to perform the BLAS operation.

* * * * *